US011880811B2

(12) United States Patent
Pawelkiewicz et al.

(10) Patent No.: US 11,880,811 B2
(45) Date of Patent: Jan. 23, 2024

(54) SYSTEM AND METHOD FOR GENERATING DATA TRANSFER RECOMMENDATIONS

(71) Applicant: The Toronto-Dominion Bank, Toronto (CA)

(72) Inventors: Tomasz Pawelkiewicz, Toronto (CA); Rachit Srivastava, Brampton (CA); Nima Habibi Beltijeh, Brampton (CA); Dalbir Channa, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 76 days.

(21) Appl. No.: 17/406,720

(22) Filed: Aug. 19, 2021

(65) Prior Publication Data
US 2023/0057996 A1     Feb. 23, 2023

(51) Int. Cl.
| | |
|---|---|
| *G06Q 20/08* | (2012.01) |
| *G06Q 20/32* | (2012.01) |
| *G06Q 20/02* | (2012.01) |
| *G06Q 20/40* | (2012.01) |

(52) U.S. Cl.
CPC .......... *G06Q 20/085* (2013.01); *G06Q 20/02* (2013.01); *G06Q 20/3276* (2013.01); *G06Q 20/403* (2013.01)

(58) Field of Classification Search
CPC .. G06Q 20/085; G06Q 20/02; G06Q 20/3276; G06Q 20/403
See application file for complete search history.

(56) References Cited

U.S. PATENT DOCUMENTS

| | | | |
|---|---|---|---|
| 10,636,087 B1* | 4/2020 | Bardouille | G06Q 20/1085 |
| 10,733,610 B2 | 8/2020 | Martin | |
| 10,902,396 B1 | 1/2021 | Brady et al. | |
| 10,915,881 B2 | 2/2021 | Kumar et al. | |
| 10,915,959 B2* | 2/2021 | Sokol | H04W 4/029 |
| 10,943,308 B1* | 3/2021 | Brandt | G10L 15/26 |
| 10,951,762 B1* | 3/2021 | Brandt | G06Q 20/40 |
| 11,127,075 B1* | 9/2021 | Mahoney | G06Q 40/12 |

(Continued)

FOREIGN PATENT DOCUMENTS

WO     2020036588     2/2020

OTHER PUBLICATIONS

Intuitive Budgeting Application, Nov. 8, 2008, IP.com Prior Art Database Technical Disclosure, pp. 1-7 (Year: 2008).*

*Primary Examiner* — Nilesh B Khatri
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to analyze historical data transfers within one or more resource accounts to generate a data budget; receive a signal indicating a data transfer request; analyze the data transfer request and, based on the data budget, determine an affordability of the data transfer; responsive to determining that the data transfer is not affordable from one of the resource accounts, generate one or more recommendations to afford the data transfer; and send, via the communications module and to a computing device, a signal causing the computing device to display a notification that includes the one or more recommendations to afford the data transfer.

20 Claims, 14 Drawing Sheets

(56) References Cited

U.S. PATENT DOCUMENTS

| | | | |
|---|---|---|---|
| 2010/0250421 A1* | 9/2010 | Ariff | G06Q 40/00 |
| | | | 705/35 |
| 2011/0320294 A1 | 12/2011 | Votaw | |
| 2013/0030994 A1* | 1/2013 | Calman | G06Q 40/00 |
| | | | 705/40 |
| 2013/0036047 A1 | 2/2013 | Busher | |
| 2014/0258022 A1* | 9/2014 | Zamer | G06Q 30/0631 |
| | | | 705/26.7 |
| 2017/0124541 A1* | 5/2017 | Aggarwal | G06Q 20/102 |
| 2018/0023270 A1 | 1/2018 | Kim | |
| 2001/8010801 | 4/2018 | O'Regan et al. | |
| 2018/0240094 A1 | 8/2018 | Perez et al. | |
| 2020/0074433 A1 | 3/2020 | Chopra et al. | |
| 2021/0110375 A1* | 4/2021 | Kohli | G06Q 20/401 |
| 2022/0101302 A1* | 3/2022 | Hope | G16Y 20/40 |
| 2022/0164699 A1* | 5/2022 | Neupane | G06Q 20/405 |

* cited by examiner

SYSTEM AND METHOD FOR GENERATING DATA TRANSFER RECOMMENDATIONS

TECHNICAL FIELD

The present application relates to systems and methods for generating data transfer recommendations.

BACKGROUND

Data transfers may be completed by transferring data from a resource account. The resource account may not have enough resources to complete the data transfer or may have enough resources to complete the data transfer but may not have enough resources to complete one or more scheduled data transfers.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
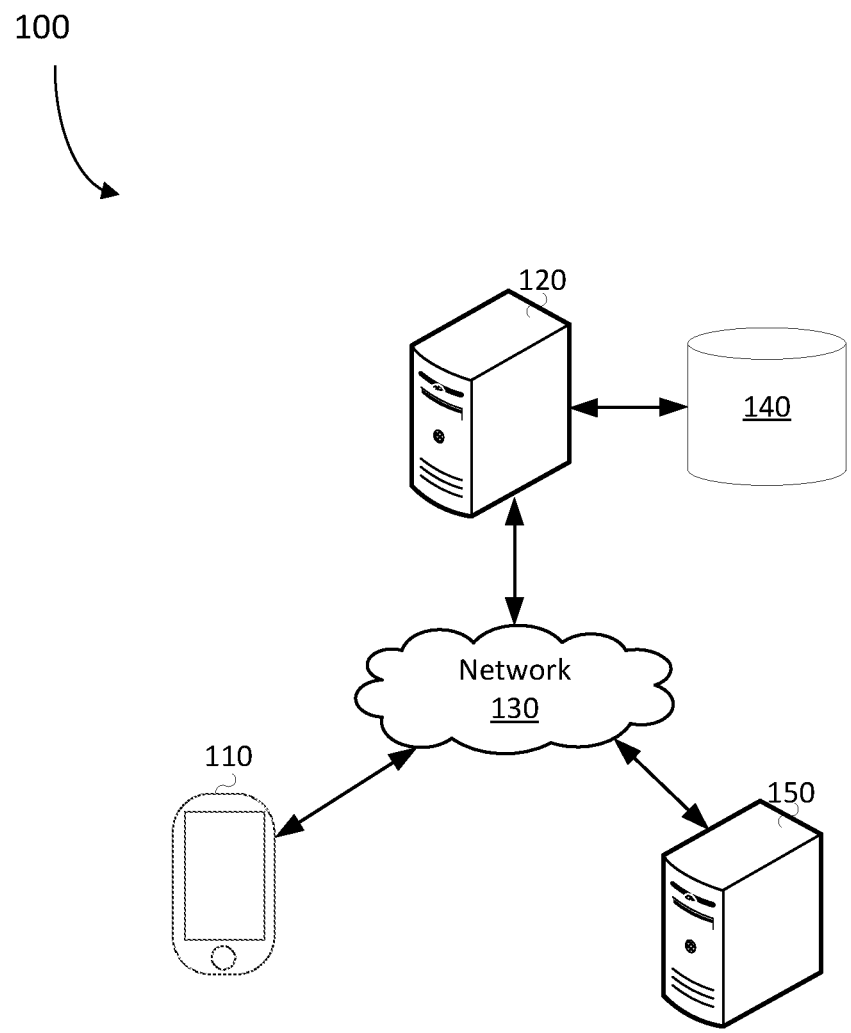
FIG. 1 is a schematic operation diagram illustrating an operating environment of an example embodiment.

In an aspect there is provided a server computer system, comprising a processor; a communications module coupled to the processor; and a memory coupled to the processor, the memory storing instructions that, when executed, configure the processor to analyze historical data transfers within one or more resource accounts to generate a data budget; receive a signal indicating a data transfer request; analyze the data transfer request and, based on the data budget, determine an affordability of the data transfer; responsive to determining that the data transfer is not affordable from one of the resource accounts, generate one or more recommendations to afford the data transfer; and send, via the communications module and to a computing device, a signal causing the computing device to display a notification that includes the one or more recommendations to afford the data transfer.

In one or more embodiments, the notification includes at least one selectable option to accept one of the recommendations.

In one or more embodiments, the instructions further configure the processor to: receive, via the communications module and from the computing device, a signal indicating selection of the at least one selectable option to accept one of the recommendations; and responsive to receiving the signal indicating selection of the at least one selectable option to accept one of the recommendations, complete the data transfer based on the accepted recommendation.

In one or more embodiments, the one or more recommendations to afford the data transfer include at least one of combining resources from multiple resource accounts; opening an additional resource account; splitting the data transfer into multiple periodic data transfers; applying loyalty points to offset or reduce an amount of the data transfer; reducing spending within one or more of the resource accounts; increasing a limit of one or more of the resource accounts; or completing the data transfer using a different resource account.

In one or more embodiments, the one or more recommendations to afford the data transfer include eliminating one or more data transfers from the data budget and the instructions further configure the processor to send, via the communications module and to the computing device, a signal causing the computing device to display a notification that reminds the user to eliminate the one or more data transfers from the budget.

In one or more embodiments, the instructions further configure the processor to receive a signal indicating a second data transfer request; analyze the second data transfer request and, based on the data budget, determine an affordability of the second data transfer; responsive to determining that the second data transfer is affordable from one of the resource accounts, send, via the communications module and to the computing device, a signal causing the computing device to display a notification indicating that the second data transfer is affordable; and complete the second data transfer.

In one or more embodiments, the data transfer request is received via the communications module and from a third party server computer system.

In one or more embodiments, the data transfer request is received via the communications module and from the computing device and in response to the computing device scanning a machine-readable code associated with the data transfer request.

In one or more embodiments, the data budget is generated based on a current amount of resources in the one or more resource accounts.

In one or more embodiments, when determining the affordability of the data transfer, the instructions further configure the processor to determine, based on the data budget, whether a balance of the resource account remains above a threshold for a period of time after the data transfer.

In another aspect there is provided a method comprising analyzing historical data transfers within one or more resource accounts to generate a data budget; receiving a signal indicating a data transfer request; analyzing the data transfer request and, based on the data budget, determining an affordability of the data transfer; responsive to determining that the data transfer is not affordable from one of the resource accounts, generating one or more recommendations to afford the data transfer; and sending, to a computing device, a signal causing the computing device to display a notification that includes the one or more recommendations to afford the data transfer.

In one or more embodiments, the notification includes at least one selectable option to accept one of the recommendations.

In one or more embodiments, the method further comprises receive, from the computing device, a signal indicating selection of the at least one selectable option to accept one of the recommendations; and responsive to receiving the signal indicating selection of the at least one selectable option to accept one of the recommendations, completing the data transfer based on the accepted recommendation.

In one or more embodiments, the one or more recommendations to afford the data transfer include at least one of combining resources from multiple resource accounts; opening an additional resource account; splitting the data transfer into multiple periodic data transfers; applying loyalty points to offset or reduce an amount of the data transfer; reducing spending within one or more of the resource accounts; increasing a limit of one or more of the resource accounts; or completing the data transfer using a different resource account.

In one or more embodiments, the one or more recommendations to afford the data transfer include eliminating one or more data transfers from the data budget and the method further comprises sending, to the computing device, a signal causing the computing device to display a notification that reminds the user to eliminate the one or more data transfers from the budget.

In one or more embodiments, the method further comprises receiving a signal indicating second data transfer request; analyzing the second data transfer request and, based on the data budget, determining an affordability of the second data transfer; responsive to determining that the second data transfer is affordable from one of the resource accounts, sending, to the computing device, a signal causing the computing device to display a notification indicating that the second data transfer is affordable; and completing the second data transfer.

In one or more embodiments, the data transfer request is received from a third party server computer system.

In one or more embodiments, the data transfer request is received from the computing device and in response to the computing device scanning a machine-readable code associated with the data transfer request.

In one or more embodiments, the data budget is generated based on a current amount of resources in the one or more resource accounts.

In another aspect there is provided a non-transitory computer readable storage medium comprising processor-executable instructions which, when executed, configure a processor to analyze historical data transfers within one or more resource accounts to generate a data budget; receive a signal indicating a data transfer request; analyze the data transfer request and, based on the data budget, determine an affordability of the data transfer; responsive to determining that the data transfer is not affordable from one of the resource accounts, generate one or more recommendations to afford the data transfer; and send, via a communications module and to a computing device, a signal causing the computing device to display a notification that includes the one or more recommendations to afford the data transfer.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 may take a variety of forms including, for example, a mobile communication device such as a smartphone, a tablet computer, a wearable computer (such as a head-mounted display or smartwatch), a laptop or desktop computer, or a computing device of another type. The computing device 110 may be associated with a user or customer having resources that are managed by or via the server computer system 120. For example, the server computer system 120 may be a financial institution server and the user may be a customer of a financial institution operating the financial institution server. The computing device 110 may store software instructions that cause the computing device 110 to establish communications with the server computer system 120.

The server computer system 120 may track, manage, and maintain resources, make lending decisions, and/or lend resources to a user or customer associated with the computing device 110. The resources may, for example, be computing resources, such as memory or processor cycles. In at least some embodiments, the resources may include stored value, such as fiat currency, which may be represented in a database. For example, the server computer system 120 may be coupled to a database 140, which may be provided in secure storage. The secure storage may be provided internally within the server computer system 120 or externally. The secure storage may, for example, be provided remotely from the server computer system 120. For example, the secure storage may include one or more data centers. The data centers may, in some embodiments, store data with bank-grade security.

The server computer system 120 may maintain a database 140 that includes various data records. For example, the server computer system 120 may be a financial institution server which may maintain customer bank accounts. In this example, a data record may, for example, reflect an amount of value stored in a particular account associated with a user. The amount of value may include a quantity of currency.

The database 140 may include data records for a plurality of resource accounts and at least some of the data records may define a quantity of resources associated with a user or customer. For example, the user that is associated with the computing device 110 may be associated with one or more resource accounts having one or more data records in the database 140. The data records may reflect a quantity of resources that are available to the user. Such resources may include owned resources and, in at least some embodiments, borrowed resources (e.g., resources available on credit). The quantity of resources that are available to or associated with a user may be reflected by a balance defined in an associated data record such as, for example, a bank balance. The resource accounts may include, for example, a chequing account, a savings account, a borrowing account such as for example a line of credit account, a credit card account, a loyalty point account, etc. As such, at least some of the data records may define a chequing account balance, a savings account balance, a line of credit account balance, a credit card account balance, a loyalty point account balance.

In some embodiments, server computer system 120 may store account data associated with the plurality of accounts. For example, the data records of the database 140 may contain profile data (such as personal information, account settings, preference data, and the like) of users associated with the accounts that are maintained at/by the server computer system 120.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The system 100 may include a third party server computer system 150. The third party server computer system 150 may be associated with a third party such as for example a merchant and may be configured to generate a data transfer request and communicate the data transfer request to the server computer system 120 via the network 130. It will be appreciated that additional third party server computer systems may be connected to the network.

Figure 2A:
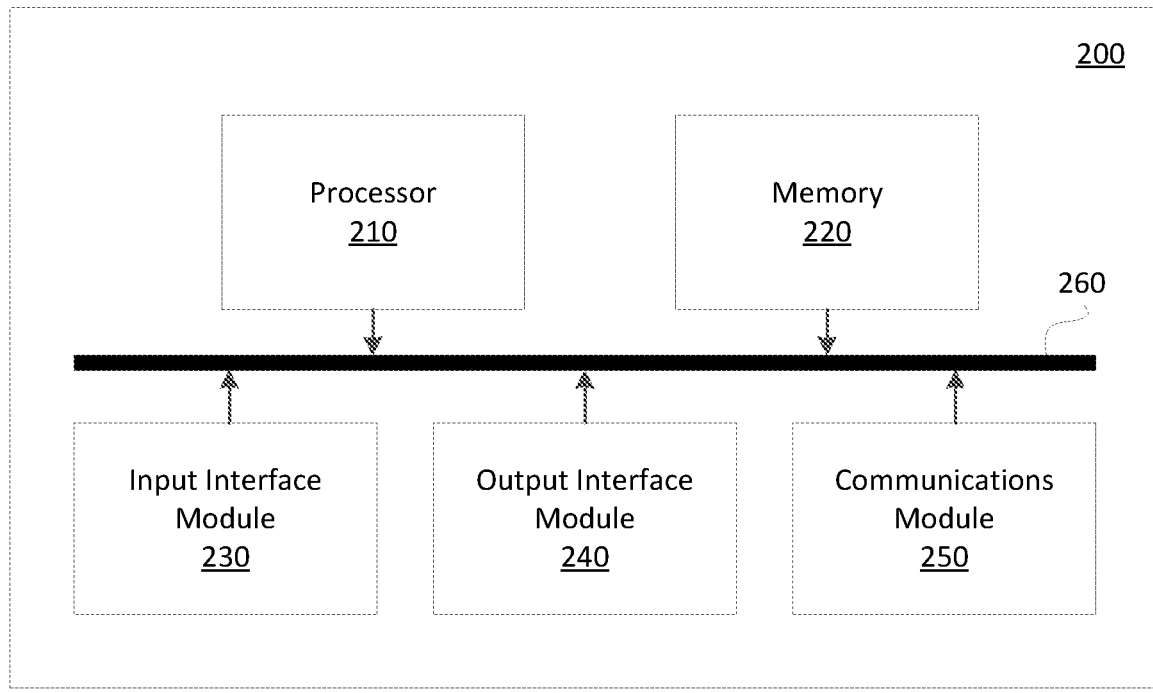
FIG. 2A is a high-level schematic diagram of an example computing device.

FIG. 2A is a high-level operation diagram of an example computer device 200. In some embodiments, the example computer device 200 may be exemplary of one or more of the computing device 110, the server computer system 120 and/or the third party server computer system 150. The example computer device 200 includes a variety of modules. For example, as illustrated, the example computer device 200, may include a processor 210, a memory 220, an input interface module 230, an output interface module 240, and a communications module 250. As illustrated, the foregoing example modules of the example computer device 200 are in communication over a bus 260.

The processor 210 is a hardware processor. Processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computer device 200.

The input interface module 230 allows the example computer device 200 to receive input signals. Input signals may, for example, correspond to input received from a user. The input interface module 230 may serve to interconnect the example computer device 200 with one or more input devices. Input signals may be received from input devices by the input interface module 230. Input devices may, for example, include a touchscreen input, keyboard, trackball, or the like. In some embodiments, all or a portion of the input interface module 230 may be integrated with an input device. For example, the input interface module 230 may be integrated with one of the aforementioned example input devices.

The output interface module 240 allows the example computer device 200 to provide output signals. Some output signals may, for example, allow provision of output to a user. The output interface module 240 may serve to interconnect the example computer device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as for example a speaker, indicator lamps (such as for example light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computer device 200 to communicate with other electronic devices and/or various communications networks. For example, the communications module 250 may allow the example computer device 200 to send or receive communications signals. Communications signals may be sent or received according to one or more protocols or according to one or more standards. For example, the communications module 250 may allow the example computer device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computer device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computer device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of memory 220.

Figure 2B:
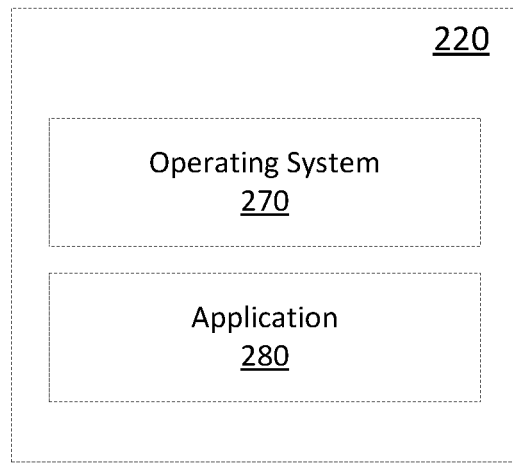
FIG. 2B is a schematic block diagram showing a simplified organization of software components stored in memory of the example computing device of FIG. 2A.

FIG. 2B depicts a simplified organization of software components stored in memory 220 of the example computer device 200. As illustrated these software components include an operating system 270 and an application 280.

The operating system 270 is software. The operating system 270 allows the application 280 to access the processor 210, the memory 220, the input interface module 230, the output interface module 240 and the communications module 250. The operating system 270 may be, for example, Apple iOS™, Google Android™, Linux™, Microsoft Windows™, or the like.

The application 280 adapts the example computer device 200, in combination with the operating system 270, to operate as a device performing particular functions. It will be appreciated that although a single application 280 is shown, in operation the memory 220 may include more than one application 280 and different applications 280 may perform different operations. For example, in at least some embodiments in which the computer device 200 is functioning as the computing device 110, the applications 280 may include a banking application. The banking application may be configured for secure communications with the server computer system 120 and may provide various banking functions such as, for example, the ability to display a quantum of value in one or more data records (e.g. display balances), configure or request that operations such as transfers of value (e.g. bill payments, email money transfers and other transfers) be performed, and other account management functions.

By way of further example, in at least some embodiments in which the computer device 200 functions as the computing device 110, the applications 280 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

Figure 3:
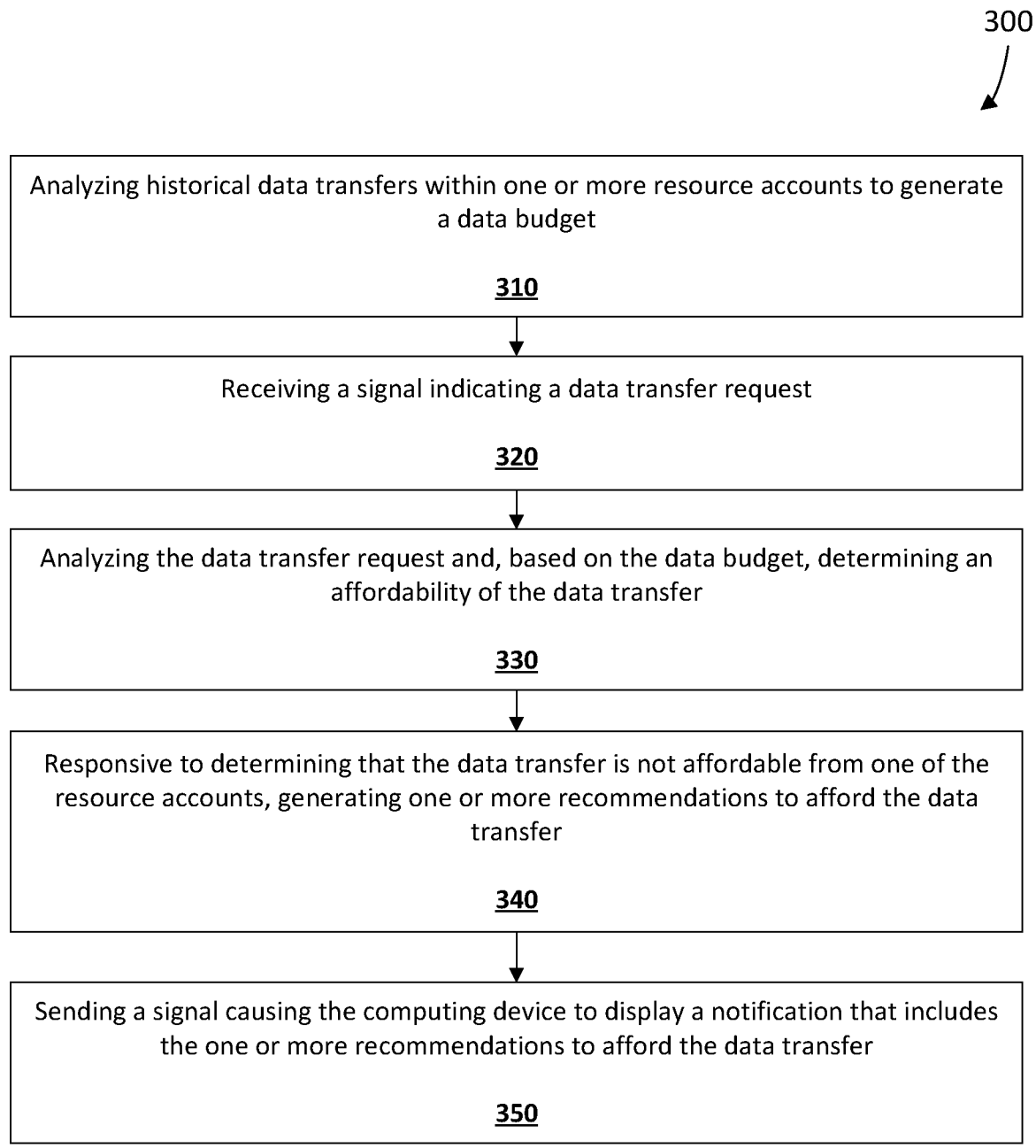
FIG. 3 shows, in flowchart form, an example method for generating data transfer recommendations.

Reference is made to FIG. 3, which illustrates, in flowchart form, a method 300 for generating data transfer recommendations. The method 300 may be implemented by a computing device having suitable processor-executable instructions for causing the computing device to carry out the described operations. The method 300 may be implemented, in whole or in part, by the server computer system 120. The server computer system 120 may off-load some operations of the method 300 to the computing device 110 (FIG. 1).

The method 300 includes analyzing historical data transfers within one or more resource accounts to generate a data budget (step 310).

In this embodiment, the server computer system 120 may obtain the historical data transfers within the one or more resource accounts from the database 140. The historical data transfers may include transfers made into and out the one or more resource accounts. The one or more resource accounts are resource accounts maintained by the server computer system 120 that are associated with a particular user or customer. The resource accounts may include a chequing account, a savings account, a cryptocurrency account, a credit card account, a borrowing account, a loyalty points account, etc. The historical data transfers may include, for example, scheduled bill payments, purchases, deposits, pay cheques, etc. The server computer system 120 may combine historical data transfers within all resource accounts to generate the data budget. The historical data transfers may include data transfers made within a time period such as for example the past twelve (12) months, the past twenty-four (24) months, the past five (5) years, etc.

In this embodiment, to generate the data budget, the server computer system 120 may engage a data budget module that may utilize artificial intelligence and/or machine-learning techniques. Specifically, the data budget module may analyze the historical data transfers to determine or predict a budget for an upcoming time period such as for example the next twelve (12) months or the next twenty-four (24) months. The data budget module may average one or more expenses to generate the data budget. For example, the data budget module may determine an average amount of a particular bill such as for example an internet bill. Specifically, the data budget module may determine that the average amount of the internet bill over the past twelve (12) months is $105 and as such may include the average amount of the internet bill into the data budget.

The data budget may be generated based a current amount of resources in the one or more resource accounts. The data budget may include a future amount of resources in the one or more resource accounts and this may be based on the historical data. For example, the data budget module may identify that a mortgage payment is taken out of a particular resource account on the first of every month and as such this may be included in the budget. As another example, the data budget module may identify that $5.00 is spent every business day (Monday to Friday) on coffee and as such this may be included in the budget.

As mentioned, the server computer system 120 may engage a data budget module that may utilize artificial intelligence and/or machine-learning techniques. As one example, the data budget module may analyze the historical data transfers to determine that one more data transfers are likely to occur and thus included in the data budget. For example, it may be determined that the user is likely to book a flight to visit family at a particular time of year and as such may be included in the data budget.

The data budget may additionally require input from the user. For example, the user may wish to generate the data budget within a banking application resident on the computing device 110. As such, within the banking application, the user may select a selectable option to generate the data budget. Responsive to the user selecting the selectable option, the server computer system 120 may cause the computing device 110 to display a user interface that may include one or more interface elements that allow the user to input one or more items to be included in the data budget. The one or more items may include, for example, bill payments, expenses, etc. Once completed, the user may select a selectable option to submit the input one or more items and the server computer system 120 may include these items in the budget.

The data budget may be or may include a ledger that tracks resources going into and out of the one or more resource accounts. The data budget may be broken down by week, month, quarter, year, etc. The data budget may be made available to the user within the banking application, mobile banking website, etc.

The method 300 includes receiving a signal indicating a data transfer request (step 320).

In one embodiment, the signal indicating the data transfer request is received from the third party server computer system 150. In this embodiment the third party server computer system 150 may be associated with a merchant such as for example an online merchant that sells products on the internet. The user may visit a website associated with the merchant to select one or more products for purchase. The user may navigate to a checkout page on the website to complete a data transfer to purchase the one or more products. The checkout page may include a selectable option to complete the transfer using a credit card or to complete the transfer using a "Pay by Bank" option.

Figure 4:
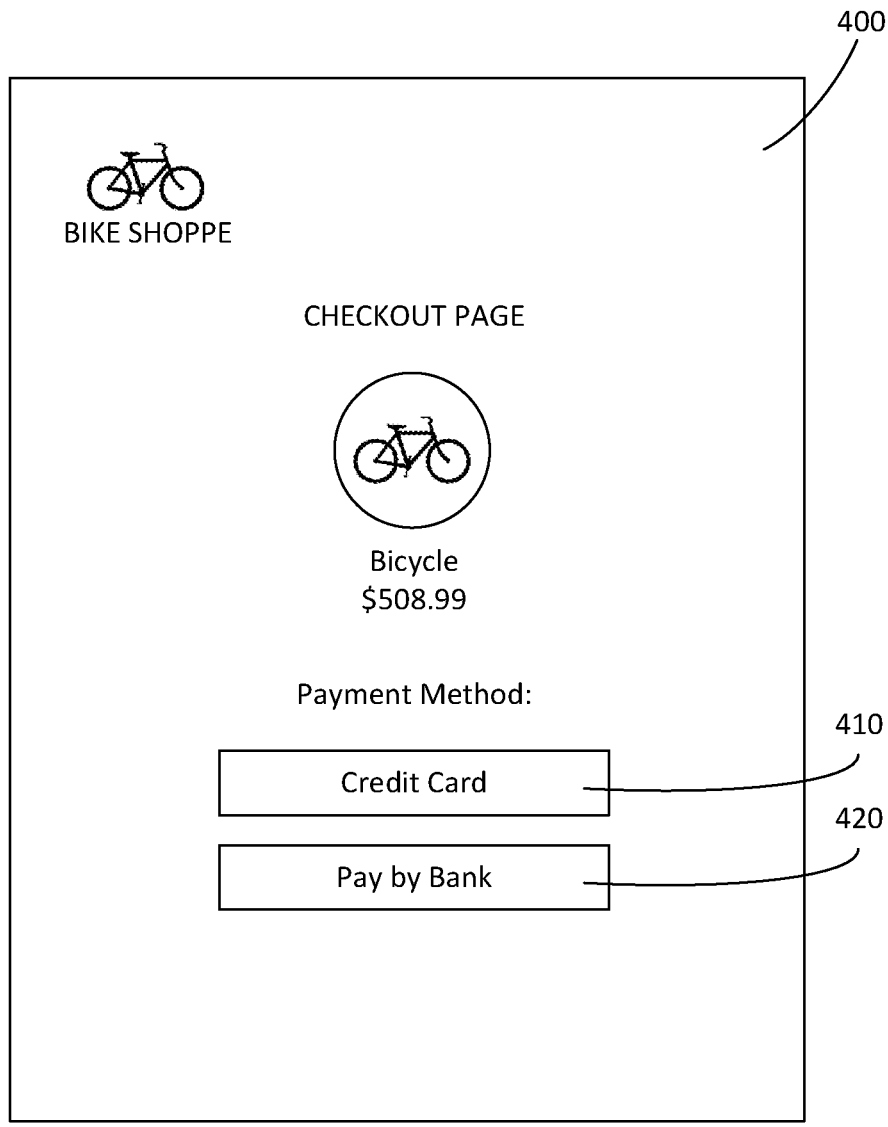
FIG. 4 shows an example user interface that includes a check-out page.

An example checkout page 400 is shown in FIG. 4. As can be seen, the checkout page 400 displays information relating to the purchase. In this example, the information indicates that the user is purchasing a bicycle for $508.99. The checkout page 400 includes a selectable option 410 that, when selected, may display a user interface to enter credit card details and to enter shipping information such as the user's address.

The checkout page 400 includes a selectable option 420 that, when selected, indicates that the user would like to "Pay by Bank." Responsive to selecting the selectable option 420, the computing device 110 may be directed to a login page associated with a mobile banking website or may be directed to the banking application resident on the computing device 110. In one or more embodiments, the computing device 110 may have data stored in memory such as for example a cookie that may be retrieved to determine which mobile banking website the computing device 110 is to navigate to. As another example, responsive to selecting the selectable option 420, the computing device 110 may display a window that includes a list of financial institutions. The user may select one of the financial institutions and in response, the computing device 110 may be directed to a mobile banking website associated with the selected financial institution.

Figure 5:
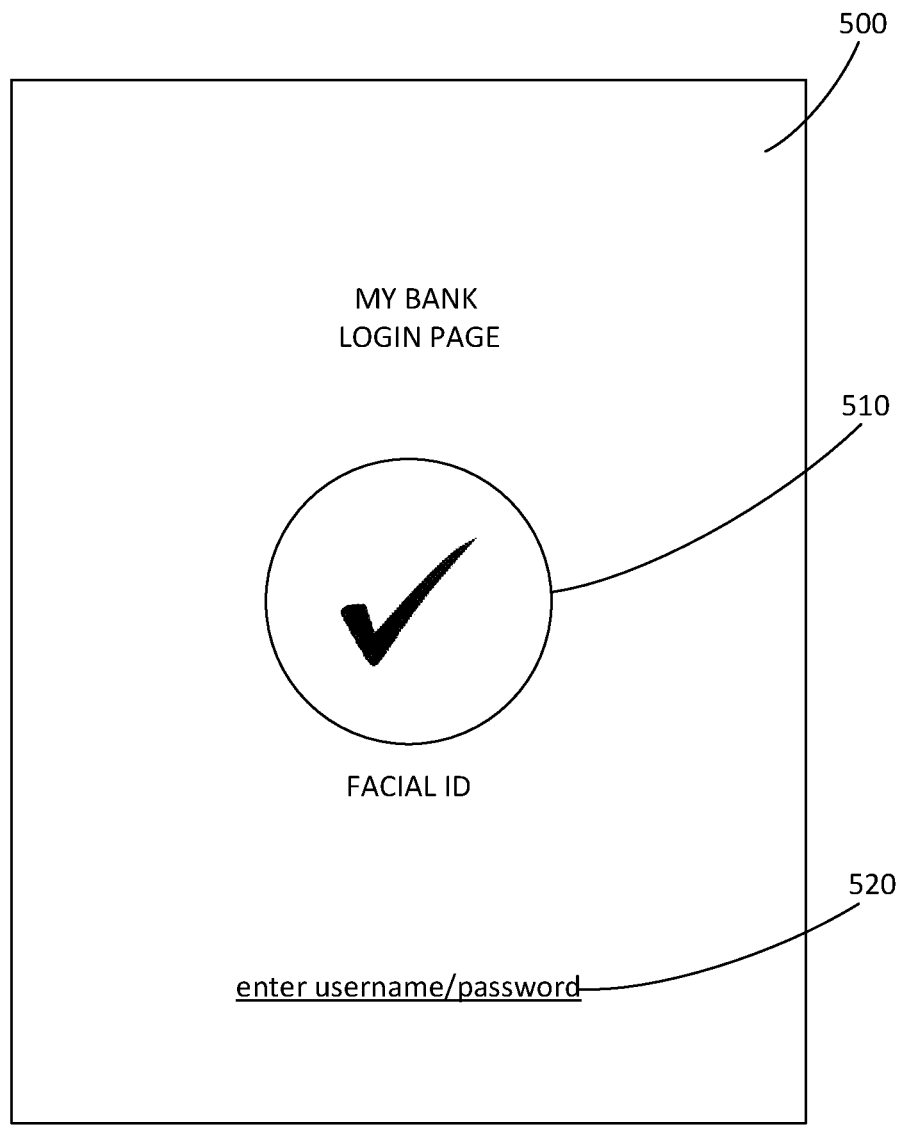
FIG. 5 shows an example user interface that includes a login page.

The user may be prompted to authenticate or login to gain access to their banking information. An example login page 500 is shown in FIG. 5. The login page 500 prompts the user to enter authentication credentials to access the mobile banking website or banking application. Authentication may be completed by the computing device 110 using, for example, facial identification and the login page 500 may include a graphical element 510 that indicates whether or not authentication via facial identification is successful. In the example shown in FIG. 5, the graphical element 510 includes a check-mark and this indicates that authentication via facial identification is successful. The login page 500 may also include a selectable option 520 that, when selected, allows a user to enter their username and password to enter the mobile banking website or banking application. Other authentication techniques may be employed such as for example by using a fingerprint scanner associated with the computing device 110.

In another embodiment, the signal indicating the data transfer request may be received from the computing device 110. In this example, the user may visit a website associated with a merchant to select one or more products for purchase and this may be done using a computing device that is different from the computing device 110. For example, the user may visit the website using a laptop or desktop computer. The user may navigate to a checkout page on the website to complete a data transfer to purchase the one or more products. The checkout page may display a machine-readable code such as for example a quick response (QR) code associated with a "Pay by Bank" option. The QR code may be generated such that it includes information relating to the data transfer request such as for example a name of the merchant and an amount of the purchase. The QR code may be displayed on a display screen of the laptop or desktop computer and the computing device 110 may scan the machine-readable code using, for example, a camera of the computing device 110. Responsive to scanning the machine-readable code, the computing device 110 may be directed to a login page associated with a mobile banking website or may be directed to the banking application resident on the computing device 110, similar to that described above with reference to FIG. 5. In this manner, the user may "Pay by Bank."

Responsive to successful authentication, the server computer system 120 receives the signal indicating the data transfer request from the third party server computer system 150. It will be appreciated that the signal indicating the data transfer request may be received from the third party server computer system 150 via another third party server computer system such as a third party server computer system associated with a particular payment or transfer rail.

The signal indicating the data transfer request may include information relating to the data transfer. The information may include identifying information of the merchant and may include an amount of the data transfer. To reduce the reliance on computing resources such as network traffic and computer processing cycles, the information may be limited in that it only provides identifying information of the merchant and the amount of the data transfer. Put another way, additional information such as for example information identifying the items that are being purchased may not be included as this information is not required to complete the purchase.

Figure 6:
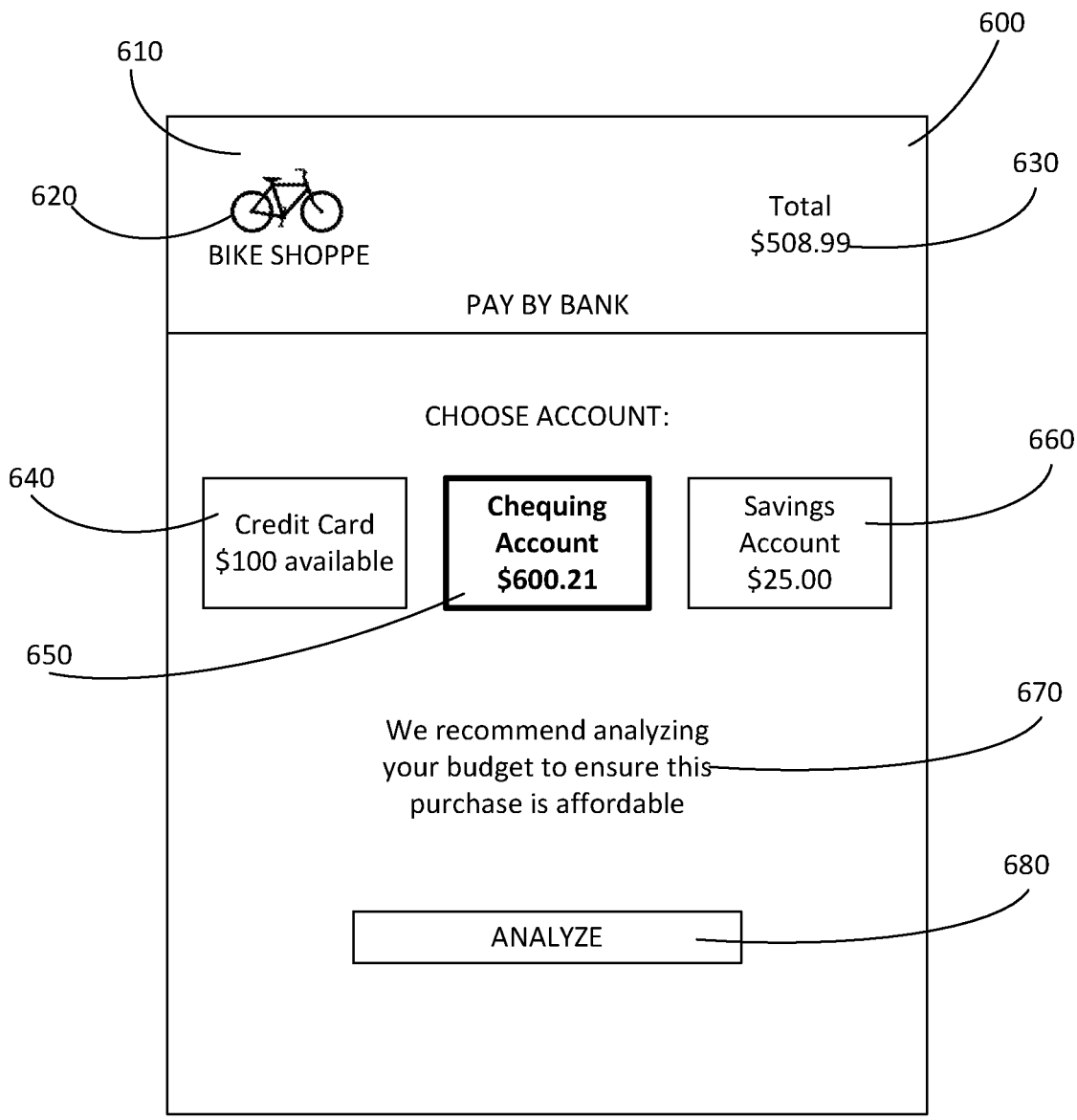
FIG. 6 shows an example user interface that includes information relating to a data transfer.

Responsive to receiving the signal indicating the data transfer request, the server computer system 120 may update a user interface displayed on the computing device 110 to include the information relating to the data transfer. An example user interface 600 is shown in FIG. 6. As can be seen, the interface 600 displays a user interface element 610 that includes the information relating to the data transfer. Specifically, the user interface element 610 includes an icon 620 that identifies the merchant and text 630 indicating the amount of the data transfer. It will be appreciated that in some embodiments, to further reduce the reliance on computing resources, the user interface element 610 may only include text identifying the merchant, that is, the icon 620 that identifies the merchant may be replaced simply by text that identifies the merchant.

The user interface 600 additionally includes information associated with the one or more resource accounts of the user. Specifically, the user interface 600 includes selectable elements 640, 650, 660 that are associated with the credit card account, the chequing account and the savings account of the user, respectively. The selectable elements 640, 650, 660 may display information associated with the resource account such as for example a current amount of resources available. Each selectable element 640, 650, 660 may be selected by the user to indicate which resource account the user would like to use to complete the data transfer. The user interface may be updated to indicate which selectable element has been selected. In the example shown in FIG. 6, the selected element is selectable element 650 and as such the selectable element 650 is displayed in a different manner than the selectable elements 640, 660.

The user interface 600 additionally includes a recommendation 670 to the user. The recommendation 670 indicates to the user that they should see if the requested data transfer fits within the data budget before completing the data transfer. The user interface 600 includes a selectable option 680 that, when selected, analyzes the data transfer request, based on the data budget, to determine an affordability of the data transfer.

The method 300 includes analyzing the data transfer request and, based on the data budget, determining an affordability of the data transfer (step 330).

In this embodiment, the server computer system 120 analyzes the data transfer request, based on the data budget, to determine an affordability of the data transfer in response to receiving, from the computing device 110, a signal indicating selection of the selectable option 680. It will be appreciated that in another embodiment, the server computer system 120 may analyze the data transfer request, based on the data budget, to determine an affordability of the data transfer in response to receiving the data transfer request. In this embodiment, the user may update one or more configuration settings within the mobile banking website or banking application to automatically analyze data transfers as they are received.

In one or more embodiments, the server computer system 120 may analyze the data transfer request by updating the data budget to include the amount of the data transfer. For example, the data budget may be in the form of a ledger and the server computer system 120 may update the ledger to include the amount of the data transfer.

To determine the affordability of the data transfer, the server computer system 120 may analyze the updated data budget to determine that a balance of the resource account remains above a threshold for a period of time after the data transfer. For example, the resource account may be a chequing account and as such the server computer system 120 may analyze the data budget to ensure the balance of the chequing account remains above zero (0) for the next six (6) months of the data budget. As another example, the resource account may be a credit card account and as such the server computer system 120 may analyze the data budget for the credit card account to ensure the amount of available credit on the credit card remains above zero (0) for the next twelve (12) months of the data budget.

The server computer system 120 may determine that the data transfer is not affordable when it is determined that the balance of the resource account drops below the threshold at some point within the period of time after the data transfer. The determination may further include a determination as to whether or not the data transfer causes the balance of the resource account to drop below the threshold. For example, the server computer system 120 may compare the data budget that does not include the data transfer to the updated data budget that includes the data budget to determine whether or not the data transfer is the cause of the balance dropping below the threshold.

As one example, the resource account may be a chequing account and the server computer system 120 may determine that the balance of the chequing account drops below zero (0) at one or more points within the next six months and that this is a result of the requested data transfer. The server computer system 120 may thus determine that the data transfer is not affordable from the chequing account.

Responsive to determining that the data transfer is not affordable from one of the resource accounts, the method 300 includes generating one or more recommendations to afford the data transfer (step 340).

When it is determined that the requested data transfer is not affordable, the server computer system 120 generates one or more recommendations to afford the data transfer. The server computer system 120 may utilize artificial intelligence and/or machine learning techniques to generate the one or more recommendations and this may be based on previous data transfers made by customers of the financial institution associated with the server computer system 120.

The one or more recommendations may include combining resources from multiple resource accounts, opening an additional resource account, splitting the data transfer into multiple periodic data transfers, applying loyalty points to offset or reduce an amount of the data transfer, reducing spending within one or more of the resource accounts, increasing a limit of one or more of the resource accounts, completing the data transfer using a different resource account, and/or eliminating one or more data transfers from the data budget.

As an example, the server computer system 120 may determine that the data transfer is affordable if the data transfer is completed by combining resources from multiple resource accounts. For example, the data transfer may be affordable by combining resources from a savings account and a chequing account.

As another example, the server computer system 120 may determine that the data transfer is affordable if the data transfer is completed by opening an additional resource account. For example, the additional resource account may include a borrowing account such as a line of credit or a credit card and the data transfer may be completed using the additional resource account.

As another example, the server computer system 120 may determine that the data transfer is affordable by splitting the data transfer into multiple periodic data transfers. For example, an additional resource account may be opened and may be used to complete the data transfer. The server computer system 120 may determine that the data transfer is affordable by splitting the data transfer into four (4) equal monthly payments and as such the server computer system 120 may schedule four (4) payments from the chequing account of the user to the additional resource account and as such the data transfer may be completed by splitting the data transfer into multiple periodic data transfers.

As another example, the server computer system 120 may determine that the data transfer is affordable by applying loyalty points to offset or reduce an amount of the data transfer. For example, the server computer system 120 may identify that the user has a loyalty points account and may determine a balance thereof. The server computer system 120 may determine that loyalty points may be applied at a redemption rate of 100:1, that is, every 100 loyalty points may be redeemed to offset the data transfer by $1. The server computer system 120 may determine that loyalty points may be used to offset or reduce the amount of the data transfer such that the data transfer is affordable.

As yet another example, the server computer system 120 may determine that the data transfer is affordable by reducing spending within one or more of the resource accounts. For example, the server computer system 120 may identify that the data transfer is affordable if the user reduces spending from one or more of the resource accounts. For example, the server computer system 120 may determine that the data transfer is affordable should the user reduce their spending on their credit card account. The reduction in spending may be general or may be across one or more spending categories. For example, the server computer system 120 may determine that the data transfer is affordable should the user reduce their "dining out" expenses by a particular amount.

As still yet another example, the server computer system 120 may determine that the data transfer is affordable by increasing a limit of one or more of the resource accounts. For example, the server computer system 120 may determine that the data transfer is affordable if the limit of the credit card account is increased.

As still yet another example, the server computer system 120 may determine that the data transfer is affordable should it be completed using a different resource account. For example, the user may wish to complete the data transfer using their chequing account but the server computer system 120 may determine that the data transfer is affordable only if it is completed using their credit card account.

As another example, the server computer system 120 may determine that the data transfer is affordable by eliminating one or more data transfers from the data budget. For example, the server computer system 120 may determine that the data transfer may be affordable should the user stop purchasing a coffee every day. As such, the server computer system 120 may determine that the transfer is affordable by eliminating a daily coffee purchase for the next thirty (30) days.

The method 300 includes sending, to a computing device, a signal causing the computing device to display a notification that includes the one or more recommendations to afford the data transfer (step 350).

Figure 7:
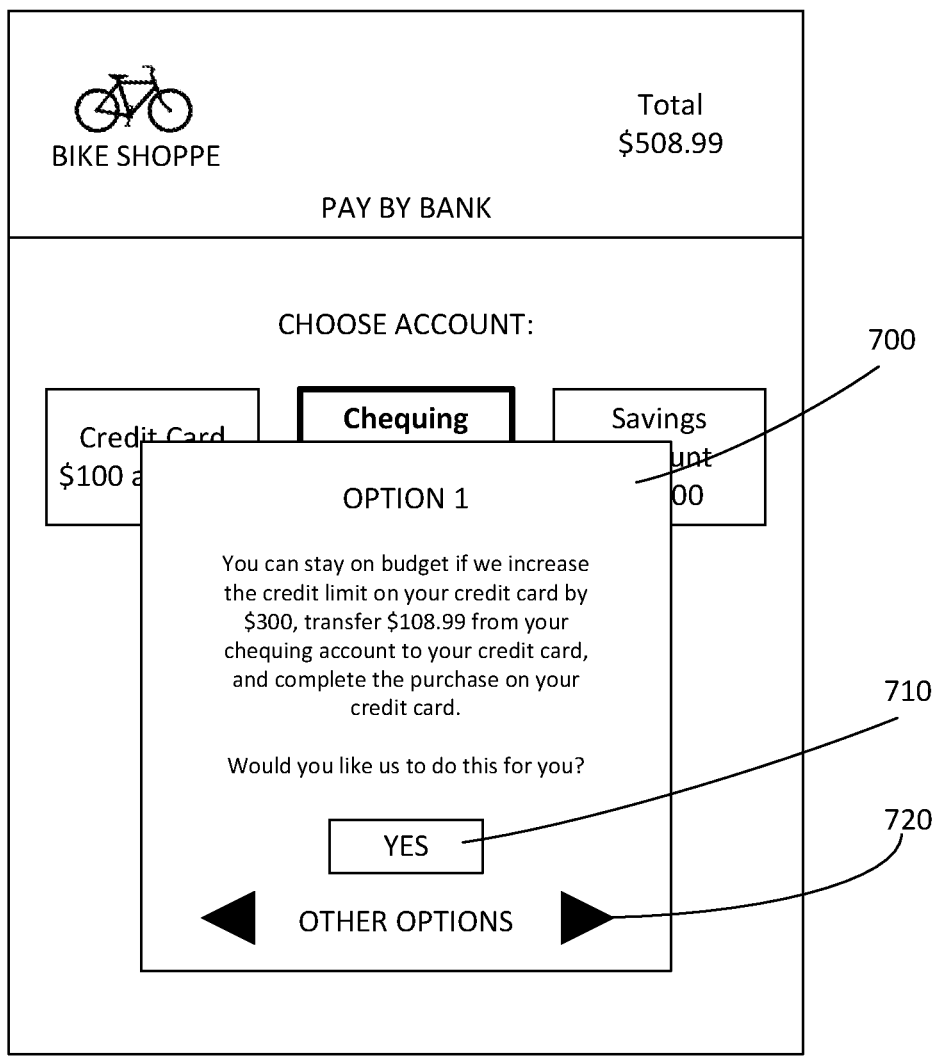
FIGS. 7 to 10 show notifications that include data transfer recommendations.

The server computer system 120 sends a signal that causes the computing device 110 to display a notification that includes the one or more recommendations. An example notification 700 is shown in FIG. 7. As can be seen, the notification 700 displays information relating to the recommendation and includes a selectable option 710 that, when selected, accepts the recommendation. In this example, the recommendation includes a recommendation to increase a limit of a credit card, to transfer resources from the chequing account to the credit card and to complete the data transfer using the credit card.

The notification 700 includes arrows 720 that may be selected by the user to toggle between different recommendations. Responsive to the user selecting an arrow 720, the notification may be updated to display a different recommendation (if one is available).

Figure 8:
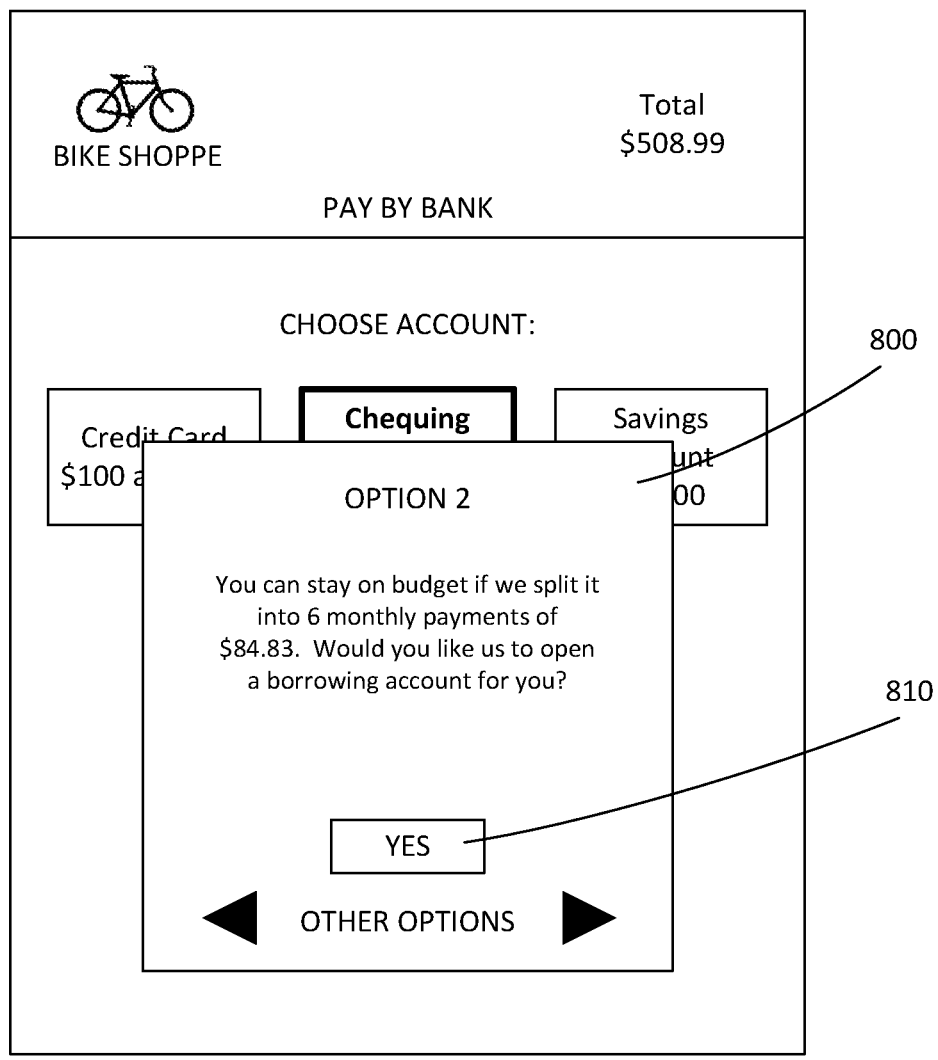

Another example notification 800 is shown in FIG. 8. As can be seen, the notification 800 displays information relating to the recommendation and includes a selectable option 810 that, when selected, accepts the recommendation. In this example, the recommendation includes a recommendation to split the data transfer into six (6) equal monthly payments and to open an additional resource account.

Figure 9:
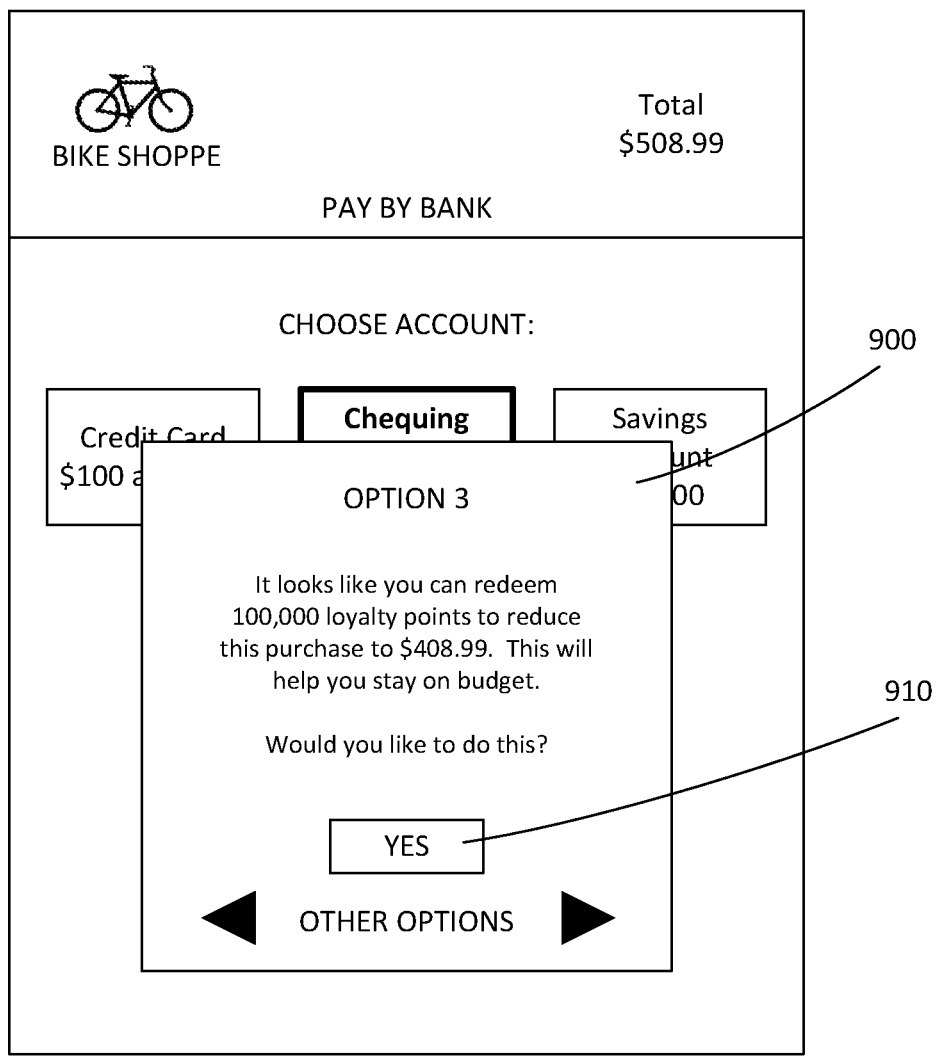

Another example notification 900 is shown in FIG. 9. As can be seen, the notification 900 displays information relating to the recommendation and includes a selectable option 910 that, when selected, accepts the recommendation. In this example, the recommendation includes a recommendation to offset or reduce the amount of the data transfer by applying loyalty points. Specifically, the recommendation includes a recommendation to redeem 100,000 loyalty points to reduce the amount of the data transfer.

Figure 10:
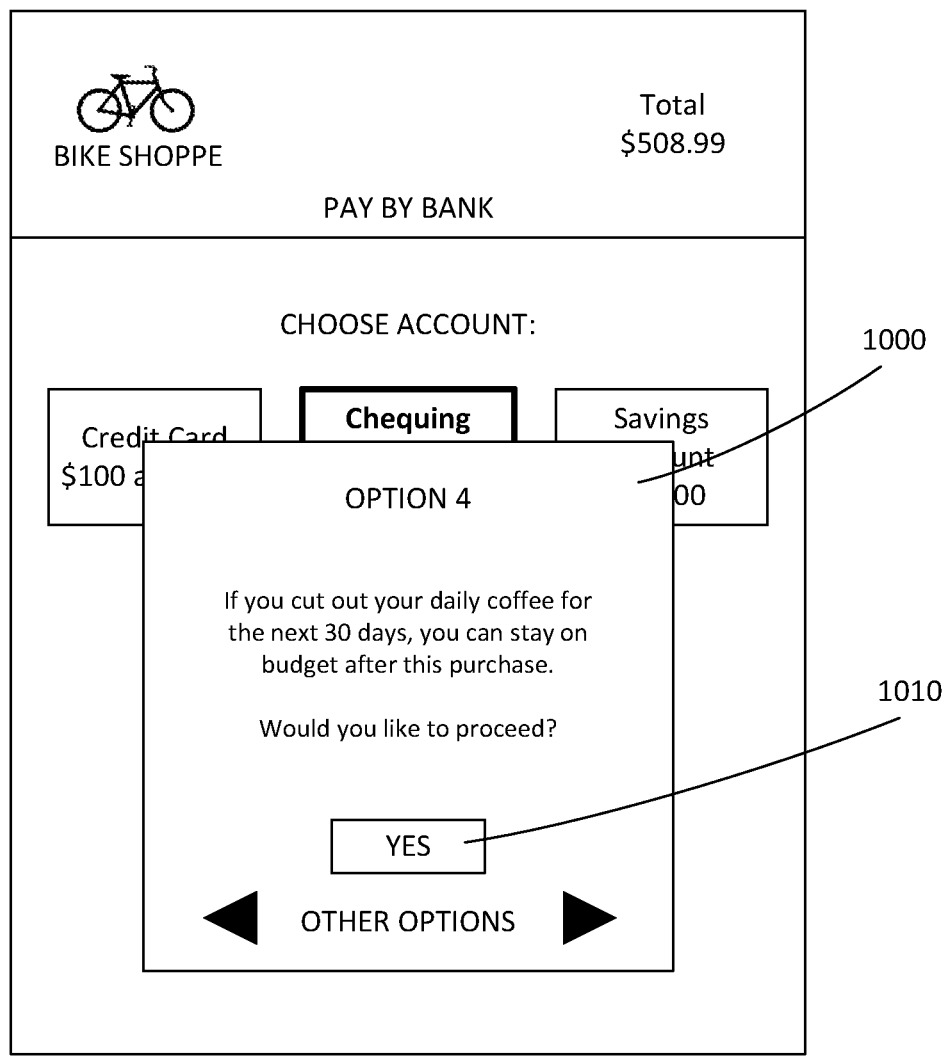

Another example notification 1000 is shown in FIG. 10. As can be seen, the notification 1000 displays information relating to the recommendation and includes a selectable option 1010 that, when selected, accepts the recommendation. In this example, the recommendation includes a recommendation to eliminate data transfers from the data budget. Specifically, the recommendation includes a recommendation to cut out a daily coffee purchase for the next thirty (30) days.

Figure 11:
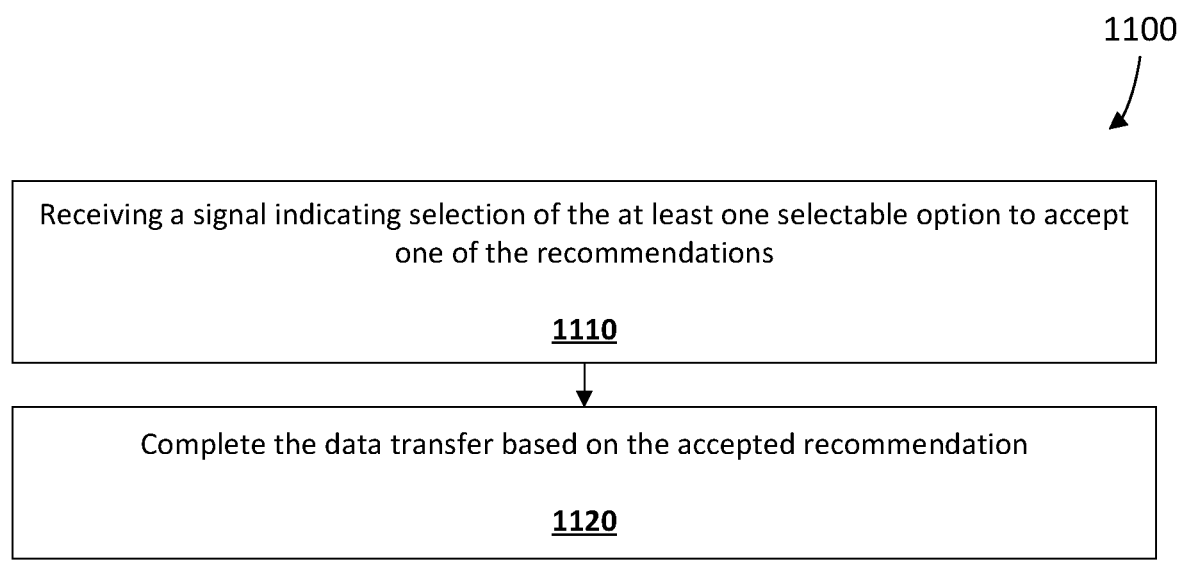
FIG. 11 shows, in flowchart form, an example method for completing a data transfer based on an accepted recommendation.

Responsive to the user selecting one of the selectable options to accept one of the recommendations, the data transfer is completed based on the accepted recommendation. Reference is made to FIG. 11, which illustrates, in flowchart form, a method 1100 for completing the data transfer based on the accepted recommendation. The method 1100 may be implemented by a computing device having suitable processor-executable instructions for causing the computing device to carry out the described operations. The method 1100 may be implemented, in whole or in part, by the server computer system 120. The server computer system 120 may off-load some operations of the method 1100 to the computing device 110 (FIG. 1).

The method 1100 includes receiving, from the computing device 110, a signal indicating selection of the at least one selectable option to accept one of the recommendations (step 1110).

In this embodiment, responsive to the user selecting one of the selectable options, the server computer system 120 receives a signal that indicates the user has selected one of the recommendations. The selectable option may be, for example, one of the selectable options 710, 810, 910, 1010 described herein.

The method 1100 includes completing the data transfer based on the accepted recommendation (1120).

Responsive to receiving the signal indicating selection of the selectable option, the server computer system 120 completes the data transfer. Specifically, the server computer system 120 transfers resources from the one or more resource accounts. The transfer may be to a resource account associated with the merchant and this may be facilitated by, for example, a third party server computer system such as a payment or transfer rail server computer system.

It will be appreciated that the server computer system 120 may store information such as an address of the user and as such completing the data transfer may include providing additional information to the third party server computer system associated with the merchant. For example, the third party server computer system 150 may require a shipping or billing address and as such the server computer system 120 may obtain this information from memory and may send the information to the third party server computer system 150 to complete the check-out process.

In at least some embodiments, one or more of the recommendations may include opening a resource account, increasing a credit limit, etc. As such, the server computer system 120 may perform one or more operations prior to completing the data transfer. For example, the server computer system 120 may perform operations to increase the credit limit and this may be done prior to completing the data transfer. Other operations that may be performed include opening a resource account, scheduling payments between resource accounts, etc.

Figure 12:
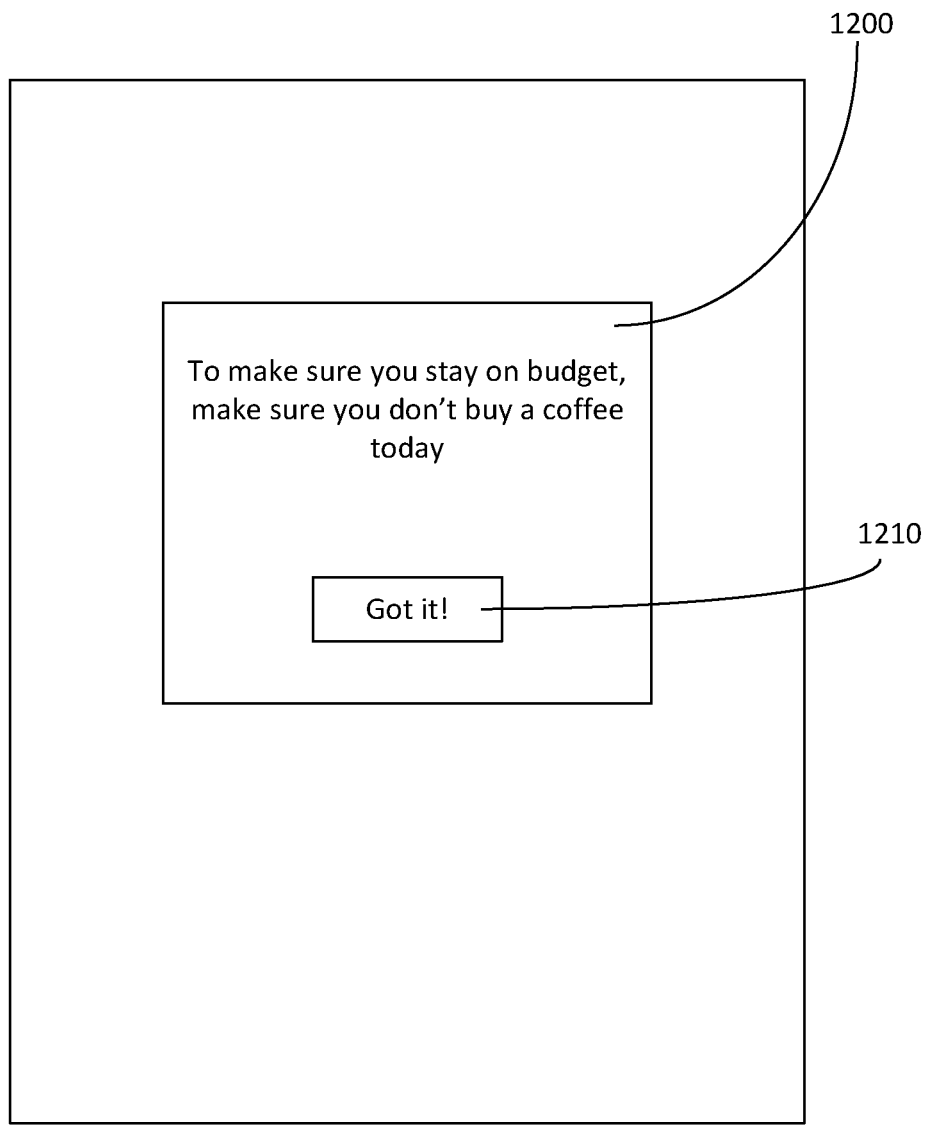
FIG. 12 shows a notification that includes a reminder.

In at least some embodiments, one or more of the recommendations may include eliminating data transfers from the data budget. In this embodiment, the server computer system 120 may perform one or more operations after the data transfer has been completed. For example, the server computer system 120 may send a notification to the user to remind them to eliminate data transfers from the data budget. For example, the recommendation may include a recommendation to cut out a daily coffee purchase for the next thirty (30) days. Responsive to the user selecting the recommendation, the server computer system 120 may schedule periodic reminders to the user to remind them to cut out their daily coffee. For example, the server computer system 120 may send, to the computing device 110, a signal causing the computing device 110 to display a notification that reminds the user to eliminate the one or more data transfers from the budget. An example is shown in FIG. 12. As can be seen, notification 1200 is displayed that reminds the user to cut out their daily coffee. The notification includes a selectable option 1210 that, when selected, removes the notification from display. The signal may be sent by the server computer system 120 periodically. For example, the signal causing the computing device 110 to display the notification may be sent at 8:00 am every morning. The signal may be sent every day for the next thirty (30) days or may only be sent on business days (Monday to Friday). The signal may alternatively be sent when it is determined that the user is approaching or within proximity of a coffee shop. For example, the server computer system 120 may engage an application programming interface (API) associated with tracking a location of the computing device 110 and when it is determined that the computing device 110 is within proximity of a coffee shop, the server computer system 120 may send the signal to the computing device 110.

Figure 13:
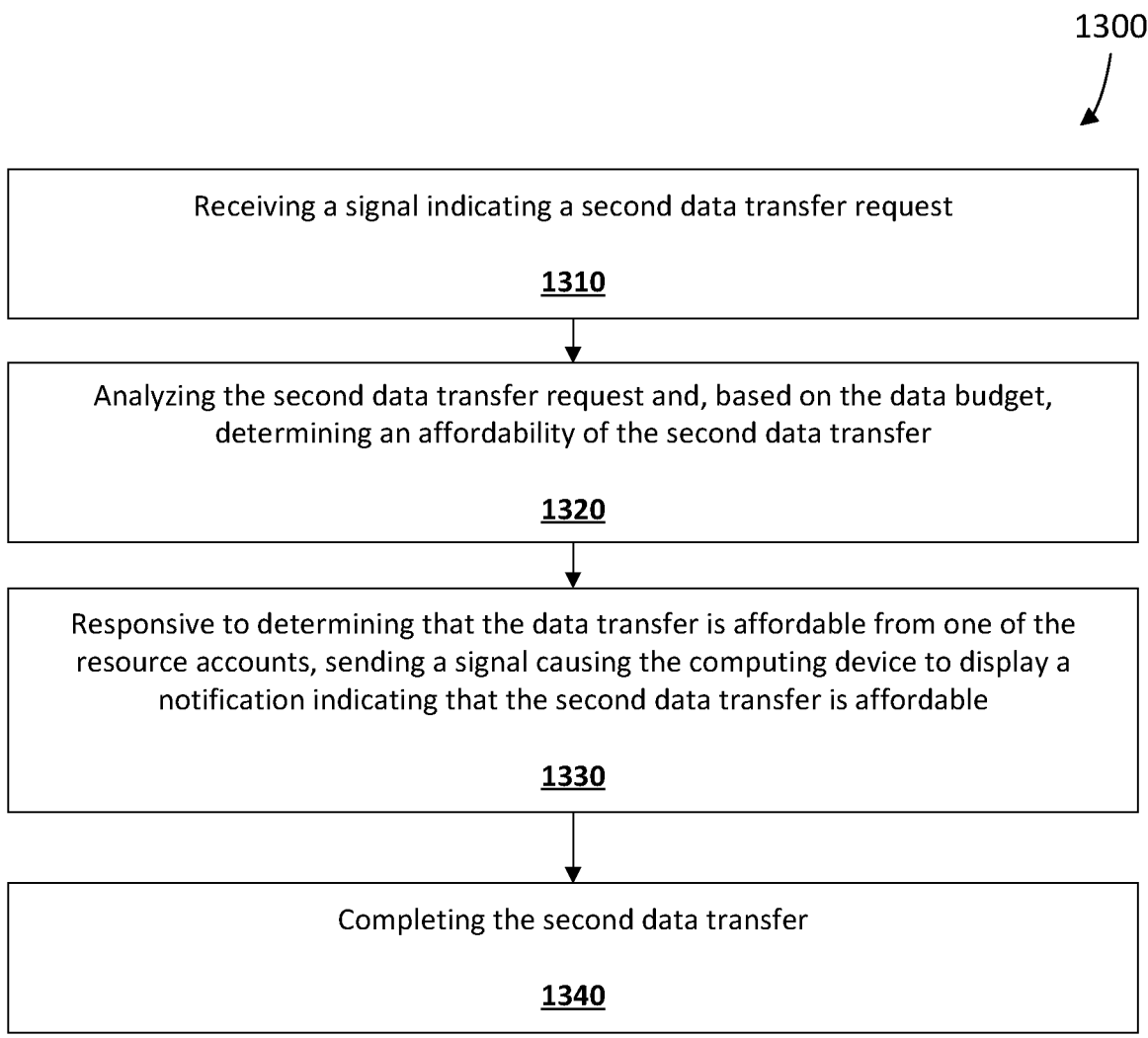
FIG. 13 shows, in flowchart form, an example method for completing a data transfer.

It will be appreciated that, during method 300, it may be determined that the data transfer request is affordable from one of the resource accounts. Reference is made to FIG. 13, which illustrates, in flowchart form, a method 1300 for completing the data transfer. The method 1300 may be implemented by a computing device having suitable processor-executable instructions for causing the computing device to carry out the described operations. The method 1300 may be implemented, in whole or in part, by the server computer system 120. The server computer system 120 may off-load some operations of the method 1300 to the computing device 110 (FIG. 1).

The method 1300 includes receiving a signal indicating a second data transfer request (step 1310). This step may be performed in manners similar to step 320 described herein.

The method 1300 includes analyzing the second data transfer request and, based on the data budget, determining an affordability of the second data transfer (step 1320). The data budget may be the data budget generated during method 300.

This step may be performed in manners similar to step 330 described herein. For example, the server computer system 120 may determine that the data transfer is affordable when it is determined that the balance of the resource account does not drop below the threshold at some point within the period of time after the data transfer. For example, the resource account may be a chequing account and the server computer system 120 may determine that the balance of the chequing account does not drop below zero (0) within the next six months. The server computer system 120 may thus determine that the data transfer is affordable from the chequing account.

Responsive to determining that the data transfer is affordable from one of the resource accounts, the method 1300 includes sending a signal causing the computing device to display a notification indicating that the second data transfer is affordable (step 1330).

Figure 14:
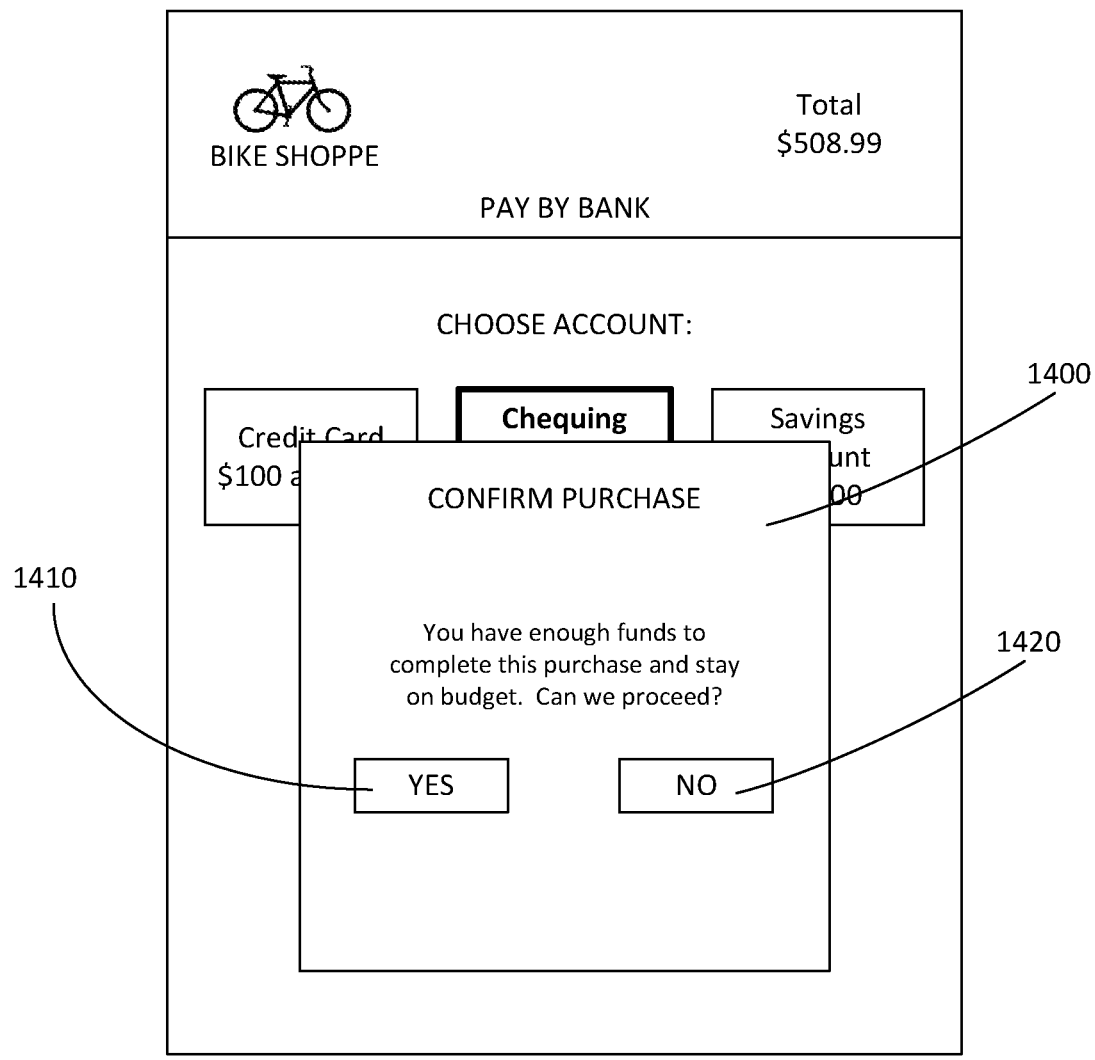
FIG. 14 shows a notification that includes information indicating that a data transfer is affordable.

An example notification 1400 is shown in FIG. 14. As can be seen, the notification 1400 includes information indicating that the data transfer is affordable. The notification includes a selectable option 1410 that, when selected, indicates that the user would like to complete the data transfer and a selectable option 1420 that, when selected, cancels the data transfer.

The method includes completing the second data transfer (step 1340).

In this embodiment, responsive to the user selecting the selectable option 1410, the server computer system 120 receives a signal indicating that the user would like to complete the data transfer. The server computer system 120 completes the data transfer in manners similar to that described herein with reference to step 350 of method 300.

It will be appreciated that in accordance with embodiments described herein, the server computer system 120 may determine that a data transfer request is not affordable and thus cannot generate any recommendations that would make the data transfer request affordable. As such, the server computer system 120 may send a signal causing the computing device 110 to display a notification indicating that the data transfer request is not affordable and cannot be completed.

In embodiments described herein various interface elements are described as being selectable by a user. The interface elements may be selected by, for example, performing a tap gesture on a display screen of a computing device. As another example, an input device such as a computer mouse may be used to select the interface elements.

The methods described above may be modified and/or operations of such methods combined to provide other methods.

In embodiments described herein, the server computer system 120 is described as generating a data budget prior to receiving a signal indicating a data transfer request, such as for example during steps 310 and 320 of the method 300. It will be appreciated that in another embodiment the server computer system 120 may generate the data budget after receiving the signal indicating the data transfer request. For example, the server computer system 120 may only generate the data budget responsive to the user selecting the selectable option 680 provided with the user interface 600.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system, comprising:
   a processor;
   a communications module coupled to the processor; and
   a memory coupled to the processor, the memory storing instructions that, when executed, configure the processor to:
   analyze historical data transfers within one or more resource accounts to generate a data budget;
   receive, via the communications module and from a third party server computer system, a signal indicating a data transfer request that includes identifying information of a merchant and an amount of the data transfer, the data transfer request initiated in response to selection of a pay by bank option presented on an online checkout page associated with the merchant and automatically directing a computing device to a login page to authenticate the computing device to identify the one or more resource accounts and to display a graphical user interface that includes information associated with the one or more resource accounts, the signal indicating the data transfer request received in response to successful authentication of the computing device;
   send, via the communications module and to the computing device, a signal to modify the graphical user interface currently displayed on the computing device to include the identifying information of the merchant and the amount of the data transfer;

analyze the data transfer request and, based on the data budget, determine an affordability of the data transfer;

responsive to determining that the data transfer is not affordable from one of the resource accounts, generate one or more recommendations to afford the data transfer; and send, via the communications module and to the computing device, a signal causing the computing device to display a notification overlayed on the modified graphical user interface currently displayed on the computing device that includes one of the recommendations to afford the data transfer and at least one selectable interface element to toggle between one or more other recommendations to afford the data transfer.

2. The server computer system of claim 1, wherein the notification includes at least one selectable option to accept one of the recommendations.

3. The server computer system of claim 2, wherein the instructions further configure the processor to:

receive, via the communications module and from the computing device, a signal indicating selection of the at least one selectable option to accept one of the recommendations; and responsive to receiving the signal indicating selection of the at least one selectable option to accept one of the recommendations, complete the data transfer based on the accepted recommendation.

4. The server computer system of claim 1, wherein the one or more recommendations to afford the data transfer include at least one of:

combining resources from multiple resource accounts;

opening an additional resource account;

splitting the data transfer into multiple periodic data transfers;

applying loyalty points to offset or reduce an amount of the data transfer;

reducing spending within one or more of the resource accounts;

increasing a limit of one or more of the resource accounts; or completing the data transfer using a different resource account.

5. The server computer system of claim 1, wherein the one or more recommendations to afford the data transfer include eliminating one or more data transfers from the data budget and the instructions further configure the processor to:

send, via the communications module and to the computing device, a signal causing the computing device to display a notification that reminds a user to eliminate the one or more data transfers from the budget.

6. The server computer system of claim 1, wherein the instructions further configure the processor to:

receive a signal indicating a second data transfer request;

analyze the second data transfer request and, based on the data budget, determine an affordability of the second data transfer;

responsive to determining that the second data transfer is affordable from one of the resource accounts, send, via the communications module and to the computing device, a signal causing the computing device to display a notification indicating that the second data transfer is affordable; and complete the second data transfer.

7. The server computer system of claim 1, wherein the data budget is generated based on a current amount of resources in the one or more resource accounts.

8. The server computer system of claim 1, wherein when determining the affordability of the data transfer the instructions further configure the processor to:

determine, based on the data budget, whether a balance of the resource account remains above a threshold for a period of time after the data transfer.

9. The server computer system of claim 1, wherein when generating the data budget, the instructions configure the processor to:

engage a machine learning data budget module to analyze the historical data transfers to determine one or more data transfers that are likely to occur.

10. The server computer system of claim 1, wherein when generating the one or more recommendations, the instructions configure the processor to:

engage a machine learning module to generate the one or more recommendations based on previous data transfers made from one or more other resource accounts.

11. A method comprising:

analyzing historical data transfers within one or more resource accounts to generate a data budget;

receiving, from a third party server computer system, a signal indicating a data transfer request that includes identifying information of a merchant and an amount of the data transfer, the data transfer request initiated in response to selection of a pay by bank option presented on an online checkout page associated with the merchant and automatically directing a computing device to a login page to authenticate the computing device to identify the one or more resource accounts and to display a graphical user interface that includes information associated with the one or more resource accounts, the signal indicating the data transfer request received in response to successful authentication of the computing device;

sending, to the computing device, a signal to modify the graphical user interface currently displayed on the computing device to include the identifying information of the merchant and the amount of the data transfer;

analyzing the data transfer request and, based on the data budget, determining an affordability of the data transfer;

responsive to determining that the data transfer is not affordable from one of the resource accounts, generating one or more recommendations to afford the data transfer; and sending, to the computing device, a signal causing the computing device to display a notification overlayed on the modified graphical user interface currently displayed on the computing device that includes one of the recommendations to afford the data transfer and at least one selectable interface element to toggle between the one or more other recommendations to afford the data transfer.

12. The method of claim 11, wherein the notification includes at least one selectable option to accept one of the recommendations.

13. The method of claim 12, further comprising:

receive, from the computing device, a signal indicating selection of the at least one selectable option to accept one of the recommendations; and responsive to receiving the signal indicating selection of the at least one selectable option to accept one of the recommendations, completing the data transfer based on the accepted recommendation.

14. The method of claim 11, wherein the one or more recommendations to afford the data transfer include at least one of:
- combining resources from multiple resource accounts;
- opening an additional resource account;
- splitting the data transfer into multiple periodic data transfers;
- applying loyalty points to offset or reduce an amount of the data transfer;
- reducing spending within one or more of the resource accounts;
- increasing a limit of one or more of the resource accounts; or
- completing the data transfer using a different resource account.

15. The method of claim 11, wherein the one or more recommendations to afford the data transfer include eliminating one or more data transfers from the data budget and the method further comprises:
- sending, to the computing device, a signal causing the computing device to display a notification that reminds a user to eliminate the one or more data transfers from the budget.

16. The method of claim 11, further comprising:
- receiving a signal indicating second data transfer request;
- analyzing the second data transfer request and, based on the data budget, determining an affordability of the second data transfer;
- responsive to determining that the second data transfer is affordable from one of the resource accounts, sending, to the computing device, a signal causing the computing device to display a notification indicating that the second data transfer is affordable; and
- completing the second data transfer.

17. The method of claim 11, wherein the data budget is generated based on a current amount of resources in the one or more resource accounts.

18. The method of claim 11, wherein when generating the data budget, the method further comprises:
- engaging a machine learning data budget module to analyze the historical data transfers to determine one or more data transfers that are likely to occur.

19. The method of claim 11, wherein when generating the one or more recommendations, the method further comprises:
- engage a machine learning module to generate the one or more recommendations based on previous data transfers made from one or more other resource accounts.

20. A non-transitory computer readable storage medium comprising processor-executable instructions which, when executed, configure a processor to:
- analyze historical data transfers within one or more resource accounts to generate a data budget;
- receive, via a communications module and from a third party server computer system, a signal indicating a data transfer request that includes identifying information of a merchant and an amount of the data transfer, the data transfer request initiated in response to selection of a pay by bank option presented on an online checkout page associated with the merchant and automatically directing a computing device to a login page to authenticate the computing device to identify the one or more resource accounts and to display a graphical user interface that includes information associated with the one or more resource accounts, the signal indicating the data transfer request received in response to successful authentication of the computing device;
- send, via the communications module and to the computing device, a signal to modify the graphical user interface currently displayed on the computing device to include the identifying information of the merchant and the amount of the data transfer;
- analyze the data transfer request and, based on the data budget, determine an affordability of the data transfer;
- responsive to determining that the data transfer is not affordable from one of the resource accounts, generate one or more recommendations to afford the data transfer; and
- send, via the communications module and to the computing device, a signal causing the computing device to display a notification overlayed on the modified graphical user interface currently displayed on the computing device that includes one of the recommendations to afford the data transfer and at least one selectable interface element to toggle between one or more other recommendations to afford the data transfer.

* * * * *